(12) United States Patent
Yasuda et al.

(10) Patent No.: US 9,640,138 B2
(45) Date of Patent: May 2, 2017

(54) INFORMATION PROCESSING SYSTEM, NON-TRANSITORY STORAGE MEDIUM ENCODED WITH COMPUTER READABLE INFORMATION PROCESSING PROGRAM, INFORMATION PROCESSING METHOD, AND INFORMATION PROCESSING TERMINAL

(71) Applicant: NINTENDO CO., LTD., Kyoto-shi, Kyoto (JP)

(72) Inventors: Shumpei Yasuda, Kyoto (JP); Masaaki Sugino, Kyoto (JP); Yu Horii, Kyoto (JP); Masatoshi Yamazaki, Kyoto (JP); Eiji Tokunaga, Kyoto (JP); Yuma Iwai, Kyoto (JP); Nobutaka Torigoe, Kyoto (JP)

(73) Assignee: NINTENDO CO., LTD., Kyoto-shi (JP)

( * ) Notice: Subject to any disclaimer, the term of this patent is extended or adjusted under 35 U.S.C. 154(b) by 43 days.

(21) Appl. No.: 14/608,697

(22) Filed: Jan. 29, 2015

(65) Prior Publication Data

US 2015/0279313 A1 Oct. 1, 2015

(30) Foreign Application Priority Data

Mar. 27, 2014 (JP) ................................. 2014-065734

(51) Int. Cl.
*G09G 5/00* (2006.01)
*G06F 3/14* (2006.01)
*G06F 3/033* (2013.01)

(52) U.S. Cl.
CPC ............ *G09G 5/006* (2013.01); *G06F 3/033* (2013.01); *G06F 3/14* (2013.01); *G06F 3/1423* (2013.01); *G06F 3/1454* (2013.01); *G09G 2330/022* (2013.01); *G09G 2330/027* (2013.01); *G09G 2370/022* (2013.01); *G09G 2370/16* (2013.01)

(58) Field of Classification Search
CPC ............... G09G 5/006; G09G 2370/16; G09G 2330/027; G09G 2370/022; G09G 2330/022; G06F 3/1454; G06F 3/1423; G06F 3/033; G06F 3/14
USPC ......................................................... 345/2.3
See application file for complete search history.

(56) References Cited

U.S. PATENT DOCUMENTS

| | | | | |
|---|---|---|---|---|
| 2008/0267104 A1* | 10/2008 | Zhang | ............... | H04W 52/0216 370/311 |
| 2009/0296617 A1* | 12/2009 | Lin | ..................... | H04W 76/048 370/311 |
| 2012/0309537 A1* | 12/2012 | Nogami | .................. | A63F 13/00 463/39 |

(Continued)

FOREIGN PATENT DOCUMENTS

JP 2012-249865 12/2012

*Primary Examiner* — Towfiq Elahi
(74) *Attorney, Agent, or Firm* — Nixon & Vanderhye P.C.

(57) ABSTRACT

An information processing system includes a first information processing terminal which can be connected to an external network and a second information processing terminal which receives data from the external network through the first information processing terminal. The first information processing terminal stands by in a sleep mode, and when a predetermined condition is satisfied, it cancels the sleep mode and transmits data from the external network to the second information processing terminal.

16 Claims, 16 Drawing Sheets

(56) References Cited

U.S. PATENT DOCUMENTS

| | | | |
|---|---|---|---|
| 2013/0036318 A1* | 2/2013 | Reams | H04N 5/4403 |
| | | | 713/322 |
| 2014/0129859 A1* | 5/2014 | O'Malley | G06F 1/3209 |
| | | | 713/323 |
| 2014/0149754 A1* | 5/2014 | Silva | G06F 1/3212 |
| | | | 713/300 |
| 2014/0278994 A1* | 9/2014 | Greenwood | H04B 1/3883 |
| | | | 705/14.55 |

* cited by examiner

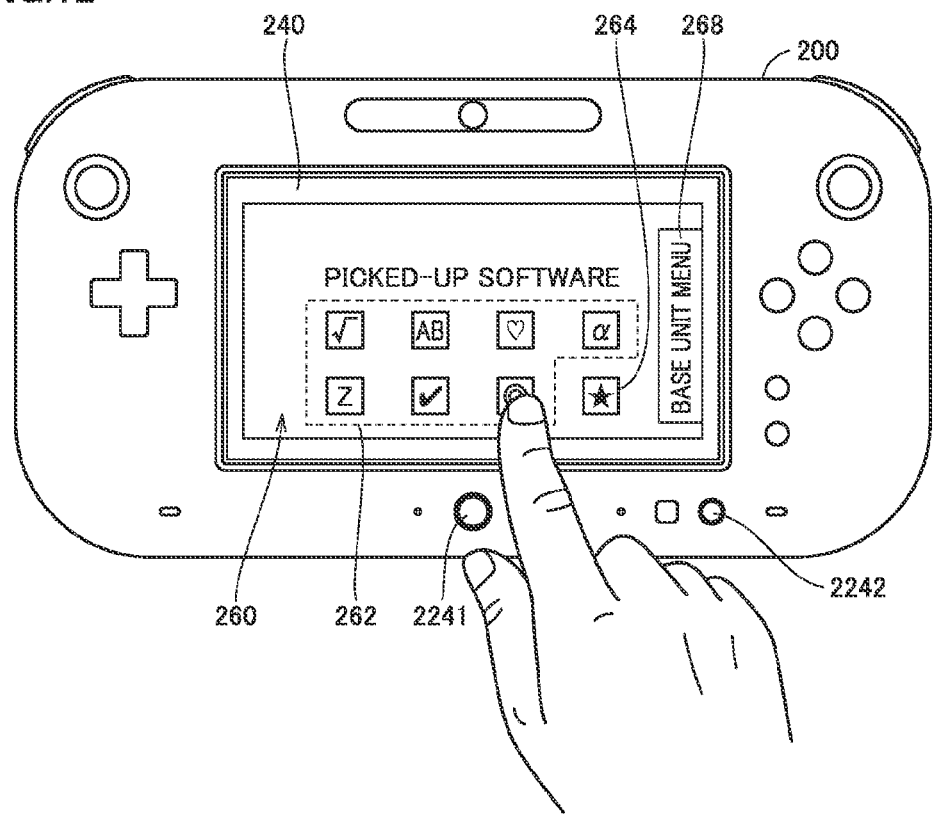

FIG.14
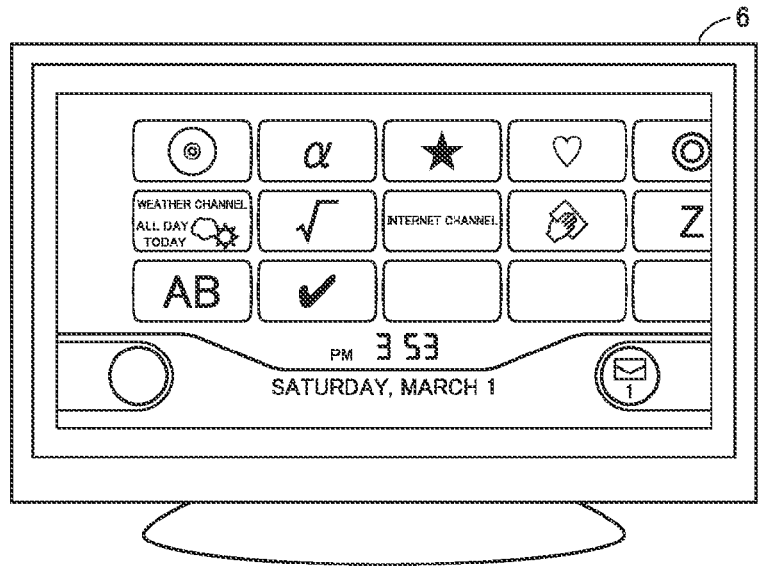
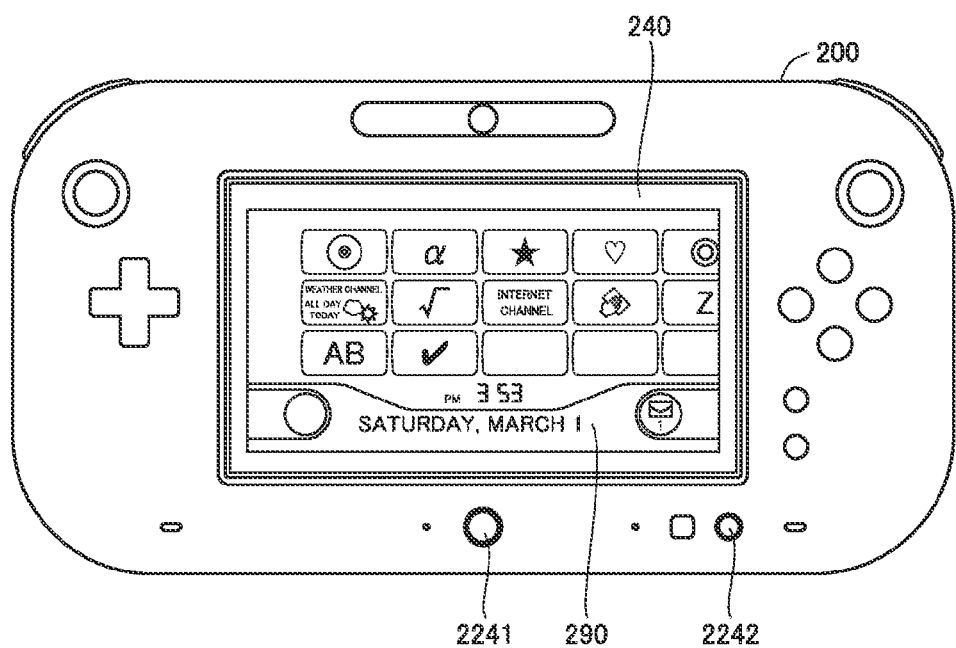

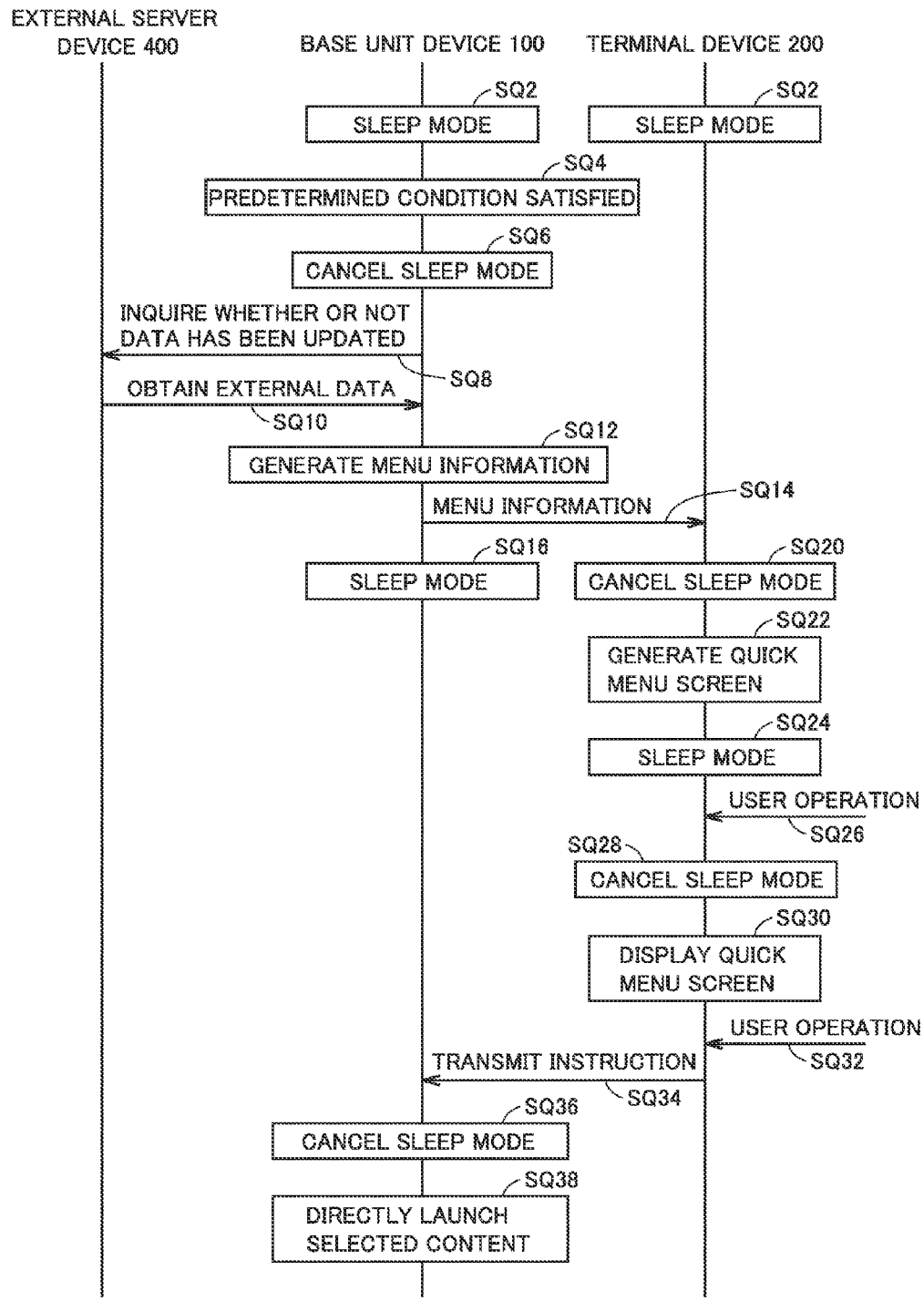

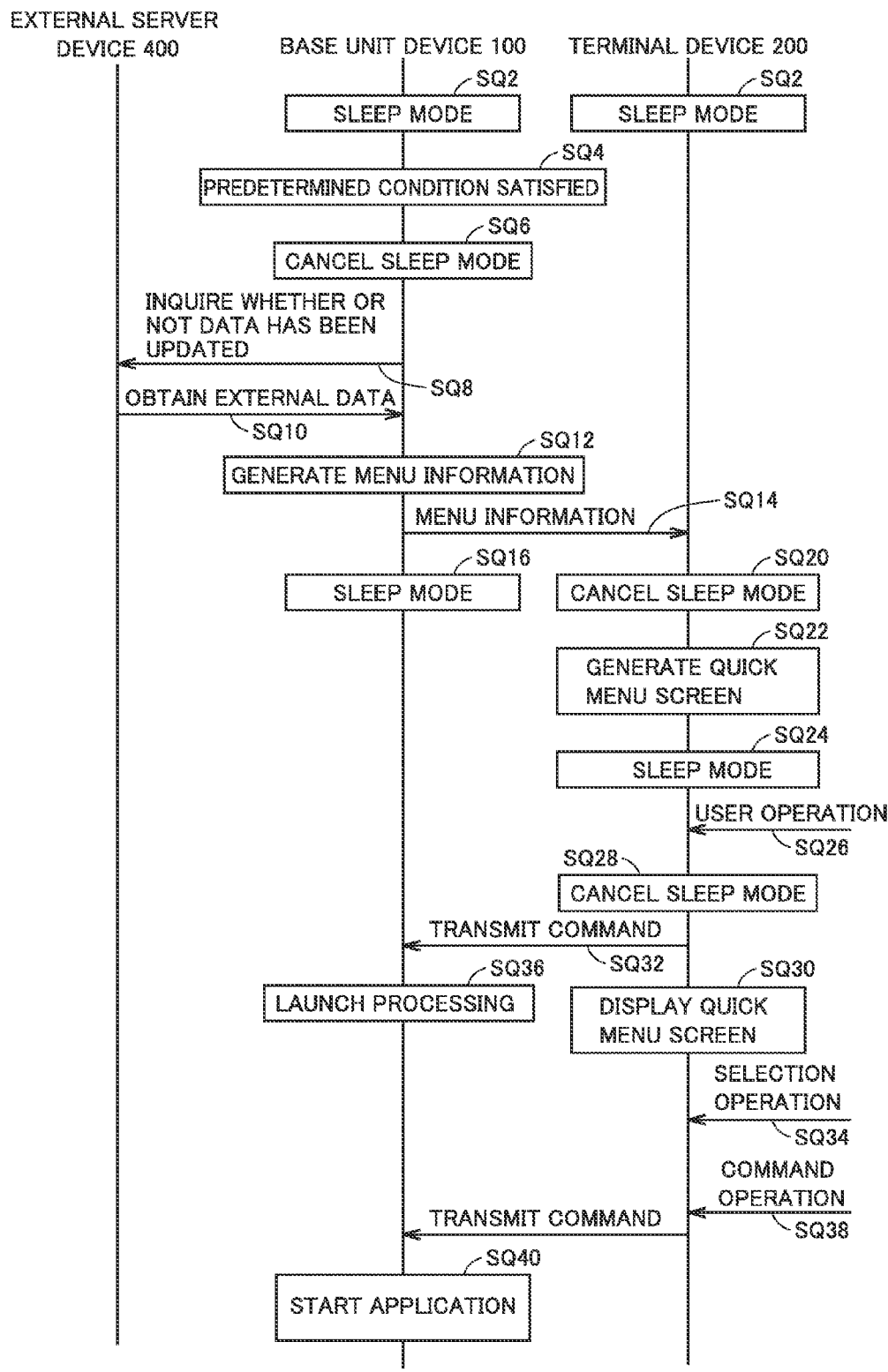

INFORMATION PROCESSING SYSTEM, NON-TRANSITORY STORAGE MEDIUM ENCODED WITH COMPUTER READABLE INFORMATION PROCESSING PROGRAM, INFORMATION PROCESSING METHOD, AND INFORMATION PROCESSING TERMINAL

This nonprovisional application is based on Japanese Patent Application No. 2014-065734 filed with the Japan Patent Office on Mar. 27, 2014, the entire contents of which are hereby incorporated by reference.

FIELD

The technology herein relates to an information processing system including a plurality of information processing terminals capable of communicating with one another, a non-transitory storage medium encoded with a computer readable information processing program executed in the information processing system, and an information processing method, as well as an information processing terminal constituting the information processing system.

BACKGROUND AND SUMMARY

Even in a situation that a stationary display device such as a television receiver cannot be made use of, an image can be provided to a user.

In such a configuration, a game device base unit is connected to an external network, and a terminal device receives data from the external network through the game device base unit. Therefore, in order to have the terminal device display the data from the external network, both of the game device base unit and the terminal device should be in a power-ON state.

In another aspect, in having some application executed in a game device base unit through a terminal device, a series of operations of having a game device base unit display executable applications and making selection is necessary.

An exemplary embodiment provides an information processing system that includes a first information processing terminal which can be connected to an external network and a second information processing terminal which receives data from the external network through the first information processing terminal. The first information processing terminal stands by in a sleep mode, and when a predetermined condition is satisfied, it cancels the sleep mode and transmits the data from the external network to the second information processing terminal.

In the exemplary embodiment, the first information processing terminal stands by in the sleep mode, and cancels the sleep mode when the predetermined condition is satisfied and obtains the data from the external network.

In the exemplary embodiment, the first information processing terminal cancels the sleep mode based on information from a time counter.

In the exemplary embodiment, the first information processing terminal transmits to the second information processing terminal, second data obtained by editing first data received from the external network.

In the exemplary embodiment, the first information processing terminal generates the second data based on information held in the first information processing terminal.

In the exemplary embodiment, the first information processing terminal generates the second data based on history of past processing information in the first information processing terminal.

In the exemplary embodiment, in the sleep mode, an information processing portion of the first information processing terminal is in a power saving state.

In the exemplary embodiment, in the sleep mode, electric power supply to an information processing portion of the first information processing terminal is cut off.

In the exemplary embodiment, the second information processing terminal also stands by in the sleep mode.

In the exemplary embodiment, in the sleep mode, an information processing portion of the second information processing terminal is in a power saving state.

In the exemplary embodiment, in the sleep mode, electric power supply to an information processing portion of the second information processing terminal is cut off.

In the exemplary embodiment, the first information processing terminal includes a communication portion capable of processing data from the second information processing terminal even in the sleep mode, and the second information processing terminal includes a communication portion capable of processing data from the first information processing terminal even in the sleep mode.

In the exemplary embodiment, the second information processing terminal informs a user of reception of data from the first information processing terminal when the second information processing terminal receives the data from the first information processing terminal.

In the exemplary embodiment, the data received from the external network includes data on an application executable in the first information processing terminal.

In the exemplary embodiment, the first information processing terminal has no image display portion.

In the exemplary embodiment, the first information processing terminal returns to the sleep mode after the first information processing terminal transmits the data from the external network to the second information processing terminal.

In the exemplary embodiment, the second information processing terminal can obtain the data from the external network only through the first information processing terminal.

An exemplary embodiment provides a non-transitory storage medium encoded with a computer readable information processing program executed by one or more processors of an information processing terminal which can be connected to an external network. The information processing program causes the processors to have another information processing terminal receive data from the external network through the information processing terminal, and to stand by in a sleep mode and cancel the sleep mode when a predetermined condition is satisfied and transmit the data from the external network to another information processing terminal.

An exemplary embodiment provides an information processing method performed in an information processing terminal which can be connected to an external network. The information processing method includes having another information processing terminal receive data from the external network through the information processing terminal, and standing by in a sleep mode, and canceling the sleep mode when a predetermined condition is satisfied and transmitting the data from the external network to another information processing terminal.

An exemplary embodiment provides an information processing terminal which can be connected to an external network. The information processing terminal has another information processing terminal receive data from the external network through the information processing terminal, and stands by in a sleep mode, and cancels the sleep mode when a predetermined condition is satisfied and transmits the data from the external network to another information processing terminal.

An exemplary embodiment provides an information processing system that includes a first information processing terminal and a second information processing terminal capable of communicating with the first information processing terminal. The second information processing terminal displays a first menu screen based on menu information which includes information on selectable contents and is obtained in advance from the first information processing terminal, and transmits, in response to selection by a user on the first menu screen, an instruction indicating a selected content to the first information processing terminal. The first information processing terminal directly launches, upon receiving the instruction from the second information processing terminal before launch, the selected content in response to the instruction.

In the exemplary embodiment, the user can directly launch the content in a single operation on the first menu screen.

In the exemplary embodiment, the second information processing terminal obtains the menu information while the first information processing terminal is in an OFF state and/or in a sleep mode.

In the exemplary embodiment, the first information processing terminal generates the menu information based on information held in the first information processing terminal.

In the exemplary embodiment, the first information processing terminal generates the menu information based on history of past processing information in the first information processing terminal.

In the exemplary embodiment, the first information processing terminal generates the menu information using data from an external network.

In the exemplary embodiment, the second information processing terminal can display a second menu screen different from the first menu screen provided by the first information processing terminal after launch.

In the exemplary embodiment, the first information processing terminal can directly display the second menu screen over the first menu screen.

In the exemplary embodiment, data on an external network can directly be accessed on the first menu screen.

In the exemplary embodiment, the first menu screen includes a piece of advertisement information.

In the exemplary embodiment, the second information processing terminal informs a user of reception of the menu information from the first information processing terminal when the second information processing terminal receives the menu information from the first information processing terminal.

In the exemplary embodiment, the second information processing terminal displays a screen different from the first menu screen for giving a notification of reception of the menu information from the first information processing terminal when the first information processing terminal receives the menu information from the first information processing terminal.

In the exemplary embodiment, the second information processing terminal is able to make selection between a mode in which image information received from the first information processing terminal is displayed as it is and a mode in which image information received from the first information processing terminal is stored and a display image is constructed using the stored image information.

In the exemplary embodiment, the contents include an application.

An exemplary embodiment provides a non-transitory storage medium encoded with a computer readable information processing program executed by one or more processors of an information processing terminal capable of communicating with another information processing terminal. Another information processing terminal displays a first menu screen based on menu information which includes information on selectable contents and is obtained in advance from the first information processing terminal and transmits, in response to selection by a user on the first menu screen, an instruction indicating a selected content to the information processing terminal. The information processing program causes the one or more processors to directly launch, upon receiving the instruction from another information processing terminal before launch, the selected content in response to the instruction.

An exemplary embodiment provides an information processing method performed in an information processing terminal capable of communicating with another information processing terminal. Another information processing terminal displays a first menu screen based on menu information which includes information on selectable contents and is obtained in advance from the first information processing terminal and transmits, in response to selection by a user on the first menu screen, an instruction indicating a selected content to the information processing terminal. The information processing method includes directly launching, upon receiving the instruction from another information processing terminal before launch, the selected content in response to the instruction.

An exemplary embodiment provides an information processing terminal capable of communicating with another information processing terminal Another information processing terminal displays a first menu screen based on menu information which includes information on selectable contents and is obtained in advance from the first information processing terminal and transmits, in response to selection by a user on the first menu screen, an instruction indicating a selected content to the information processing terminal. The information processing terminal directly launches, upon receiving the instruction from another information processing terminal before launch, the selected content in response to the instruction.

An exemplary embodiment provides an information processing system including a first information processing terminal and a second information processing terminal which can communicate with each other. The first information processing terminal directly launches a content selected by a user when the user selects the content by operating the second information processing terminal while the first information processing terminal is in a non-launched state.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIGS. 12 to 14 show exemplary illustrative non-limiting processing examples in connection with an operation on the quick menu screen in the information processing system in the present embodiment.

FIG. 15 shows an exemplary illustrative non-limiting sequence diagram illustrating a typical processing procedure in the information processing system in the present embodiment.

FIG. 16 shows an exemplary illustrative non-limiting sequence diagram illustrating a variation of the typical processing procedure in the information processing system in the present embodiment.

DETAILED DESCRIPTION OF NON-LIMITING EXAMPLE EMBODIMENTS

Figure 1:
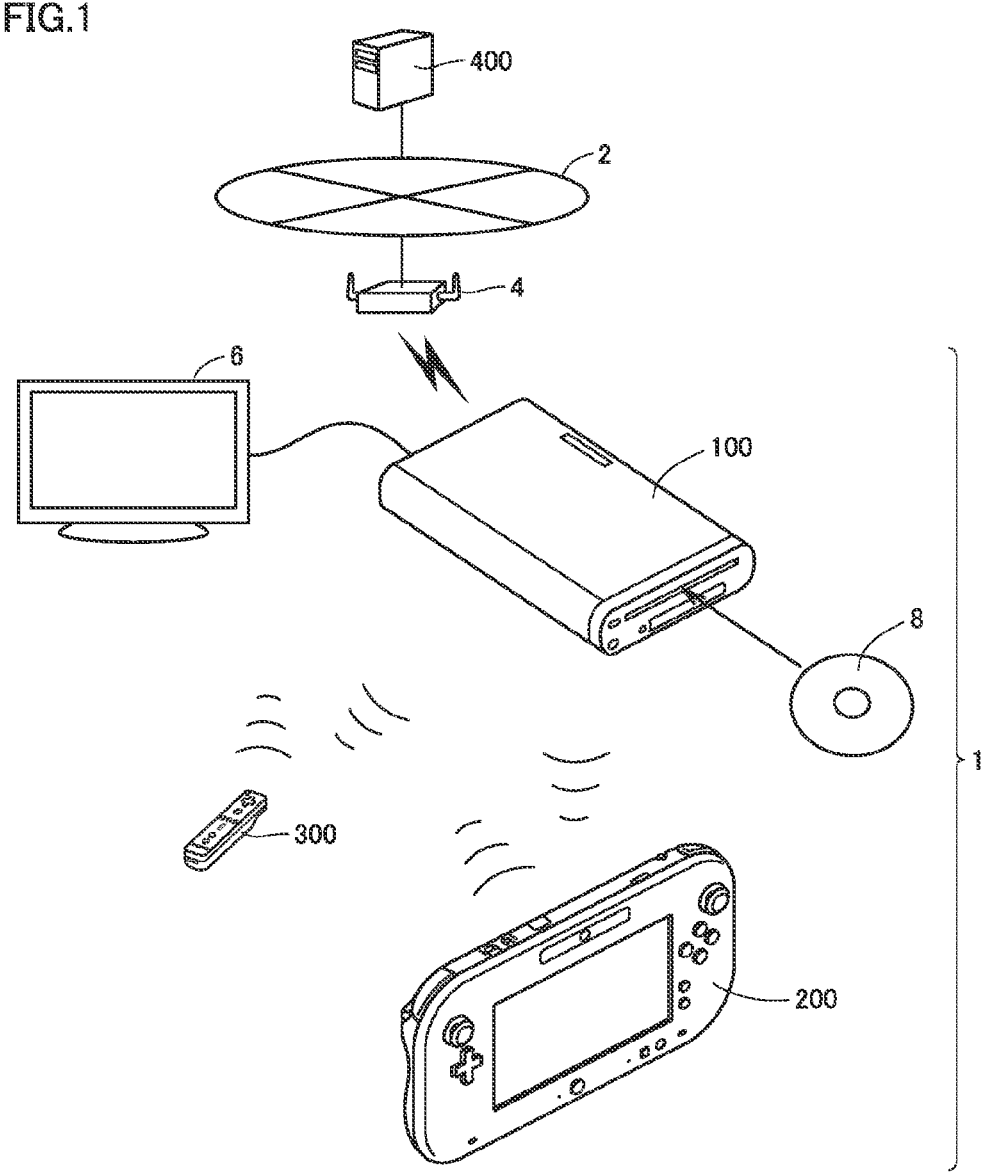
FIG. 1 shows an exemplary illustrative non-limiting schematic diagram illustrating a configuration example of an information processing system in the present embodiment.

The present embodiment will be described in detail with reference to the drawings. The same or corresponding elements in the drawings have the same reference characters allotted and description thereof will not be repeated.

A. Configuration Example a1: Information Processing System 1

Referring to FIG. 1, an information processing system 1 includes a base unit device 100 representing one example of a first processing terminal, a terminal device 200 representing one example of a second information processing terminal, and a controller 300. A display device 6 such as a home television receiver is connected to base unit device 100.

Information processing system 1 can provide interactive processing to a user by executing an application. Though information processing system 1 can typically be used as a game system, it can be used as a system or the like providing various types of information, without being limited as such.

Main body device 100 is an entity performing various types of processing in information processing system 1, and it executes an application installed in advance and outputs video images and/or voice and sound generated as a result of execution to display device 6 or the like. An application is typically distributed through an optical storage medium 8 such as a digital versatile disk (DVD). Main body device 100 is configured to be able to communicate with terminal device 200 and controller 300, and can execute an application in accordance with a user operation from terminal device 200 and controller 300 and also output information in accordance with a result of execution to terminal device 200 and controller 300.

Data is exchanged typically through wireless communication between base unit device 100 and terminal device 200 and between base unit device 100 and controller 300. Such wireless communication includes, for example, wireless LAN in conformity with IEEE 802.11n specifications, a scheme in conformity with Bluetooth™ specifications, or infrared communication in conformity with Infrared Data Association (IRDA) specifications.

Main body device 100 can further be connected to an external network 2 such as the Internet. By way of example, base unit device 100 is connected to external network 2 through wireless communication with an access point 4. Main body device 100 exchanges data with an external server device 400 present on external network 2. Wireless communication is established between base unit device 100 and access point 4 through wireless LAN in conformity, for example, with IEEE 802.11n.

Terminal device 200 includes an operation portion accepting a user operation, transmits data indicating the user operation to base unit device 100, and includes a display portion displaying an image from base unit device 100 to a user. Namely, terminal device 200 receives data from external network 2 through base unit device 100. Controller 300 includes an operation portion accepting a user operation, transmits data indicating the user operation to base unit device 100, and includes a notification portion giving a notification to a user in accordance with the data from base unit device 100.

a2: Main Body Device 100

Figure 2:
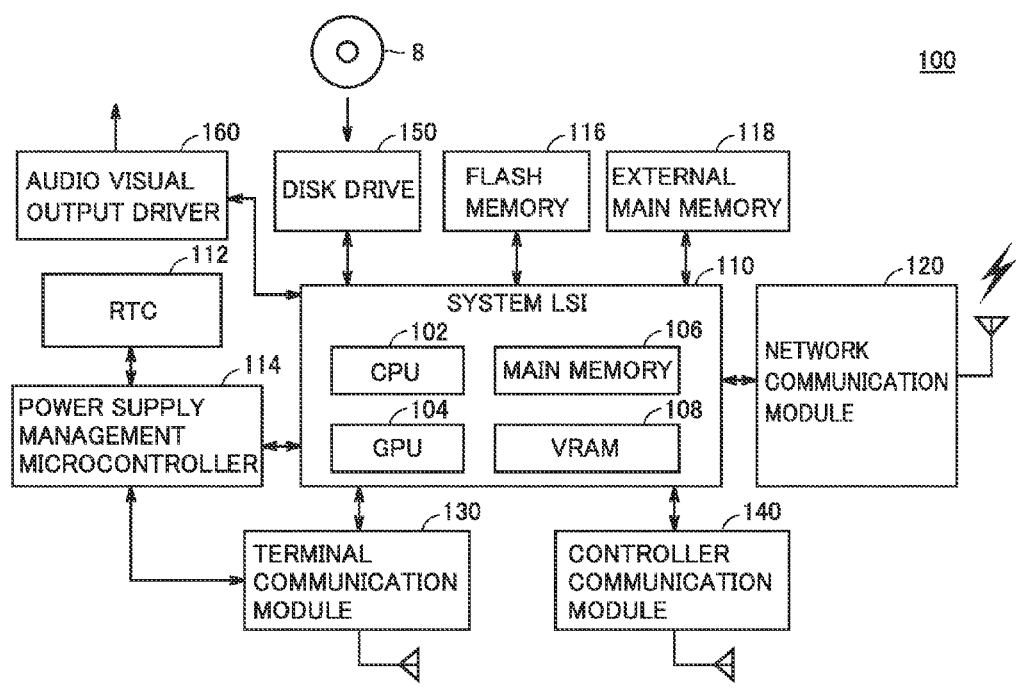
FIG. 2 shows an exemplary illustrative non-limiting schematic diagram illustrating a configuration example of a base unit device included in the information processing system in the present embodiment.

Referring to FIG. 2, base unit device 100 includes a system large scale integration (LSI) 110, a real time clock (RTC) 112, a power supply management microcontroller 114, a flash memory 116, an external memory 118, a network communication module 120, a terminal communication module 130, a controller communication module 140, a disk drive 150, and an audio visual output driver 160.

System LSI 110 is a processing engine in base unit device 100 and corresponds to an information processing portion. System LSI 110 includes a central processing unit (CPU) 102, a graphical processing unit (GPU) 104, a main memory 106, and a video random access memory (VRAM) 108. As will be described later, power ON/OFF of system LSI 110 is controlled by power supply management microcontroller 114. CPU 102 executes an operating system and/or an application. GPU 104 performs processing mainly involved with display. Main memory 106 functions as a working memory storing temporary data necessary for execution of a program by CPU 102. VRAM 108 functions as a working memory for displaying an image generated through processing by GPU 104. It is not necessary to mount all components included in system LSI 110 on a single LSI, and some of them may be mounted outside the LSI.

Flash memory 116 can be accessed by system LSI 110, and stores an operating system and/or an application in a non-volatile manner. External memory 118 functions as a working memory in coordination with main memory 106 within system LSI 110.

RTC 112 is a device providing a time counting function and manages current time and time intervals. RTC 112 gives current time to system LSI 110 as required. Power supply management microcontroller 114 is connected to terminal communication module 130, and manages a power supply of system LSI 110 in accordance with data received from terminal device 200. A component in which RTC 112 and power supply management microcontroller 114 are integrated may be adopted. Another device instead of RTC 112 may be adopted so long as the device has a time counting function.

Network communication module 120 is a communication interface for communicating with external network 2. Terminal communication module 130 is a communication interface for communicating with terminal device 200. Controller communication module 140 is a communication interface for communicating with controller 300. A configuration adapted to each communication scheme is adopted for these communication modules. A configuration in which all or some of these communication modules are physically integrated can also be adopted.

Disk drive 150 reads data from optical storage medium 8 and outputs the data to system LSI 110 or the like.

Audio visual output driver 160 outputs a video signal and an audio signal output from system LSI 110 to display device 6.

a3: Terminal Device 200

Figure 3:
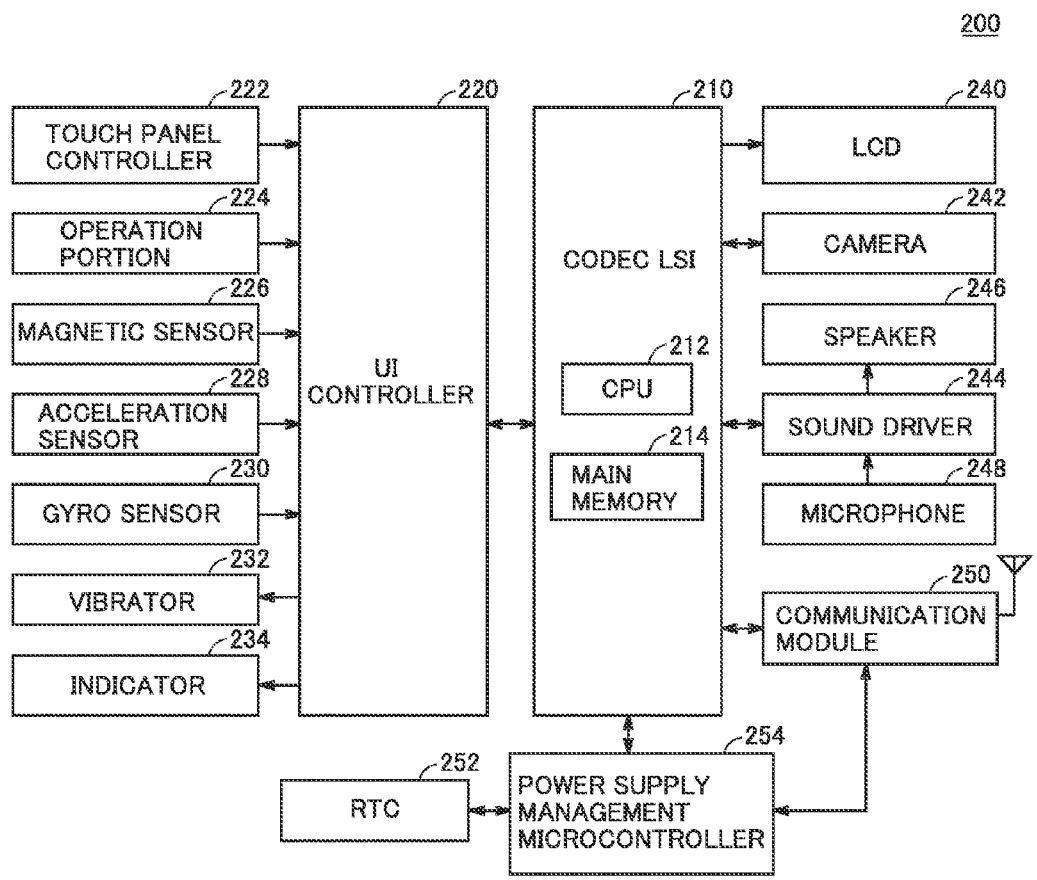
FIG. 3 shows an exemplary illustrative non-limiting schematic diagram illustrating a configuration example of a terminal device included in the information processing system in the present embodiment.

Referring to FIG. 3, terminal device 200 includes a codec LSI 210, a user interface (UI) controller 220, a touch panel controller 222, an operation portion 224, a magnetic sensor 226, an acceleration sensor 228, a gyro sensor 230, a vibrator 232, an indicator 234, a liquid crystal display (LCD) 240, a camera 242, a sound driver 244, a speaker 246, a microphone 248, a communication module 250, an RTC 252, and a power supply management microcontroller 254.

Codec LSI 210 is a processing engine in terminal device 200 and corresponds to an information processing portion. Codec LSI 210 includes a CPU 212 and a main memory 214. CPU 212 executes a program stored in advance by using data from base unit device 100. Main memory 214 functions as a working memory storing temporary data necessary for execution of a program by CPU 212. Codec LSI 210 may include a GPU and a VRAM.

UI controller 220 collects signals from devices mounted on terminal device 200 and provides those signals to codec LSI 210.

Touch panel controller 222 outputs, in response to a user operation onto a touch panel provided in correspondence with LCD 240, a signal indicating that user operation to UI controller 220. Operation portion 224 includes a button switch, a cross-shaped key, and/or an analog controller, and outputs a signal indicating an operation performed by a user to UI controller 220. Magnetic sensor 226 detects the magnetism of the earth, and outputs a signal indicating inclination of terminal device 200 to UI controller 220. Acceleration sensor 228 detects velocity and/or acceleration of a user operation provided to terminal device 200 and outputs a signal indicating that detection value to UI controller 220. Gyro sensor 230 detects angular velocity and/or angular acceleration of a user operation provided to terminal device 200 and outputs a signal indicating that detection value to UI controller 220. Vibrator 232 generates vibration in terminal device 200 in response to an instruction from UI controller 220. Indicator 234 includes a light emitting diode (LED), and gives a notification to a user by turning on and/or blinking in response to an instruction from UI controller 220.

LCD 240 corresponds to a display portion of terminal device 200 and displays an image generated by codec LSI 210. Camera 242 is provided on a main surface and/or a rear surface of terminal device 200, and outputs an image obtained by image pick-up of a subject to codec LSI 210. Sound driver 244 has speaker 246 emit voice and sound in accordance with an audio signal from codec LSI 210, and outputs an audio signal indicating voice and sound obtained by microphone 248 to codec LSI 210. Communication module 250 is connected to codec LSI 210 and it is a communication interface for communicating with base unit device 100.

RTC 252 manages current time and provides current time to codec LSI 210 as required. Power supply management microcontroller 254 is connected to communication module 250, and manages a power supply of codec LSI 210 in accordance with data received from base unit device 100.

B. Processing Outlines (No. 1)

Figure 4:
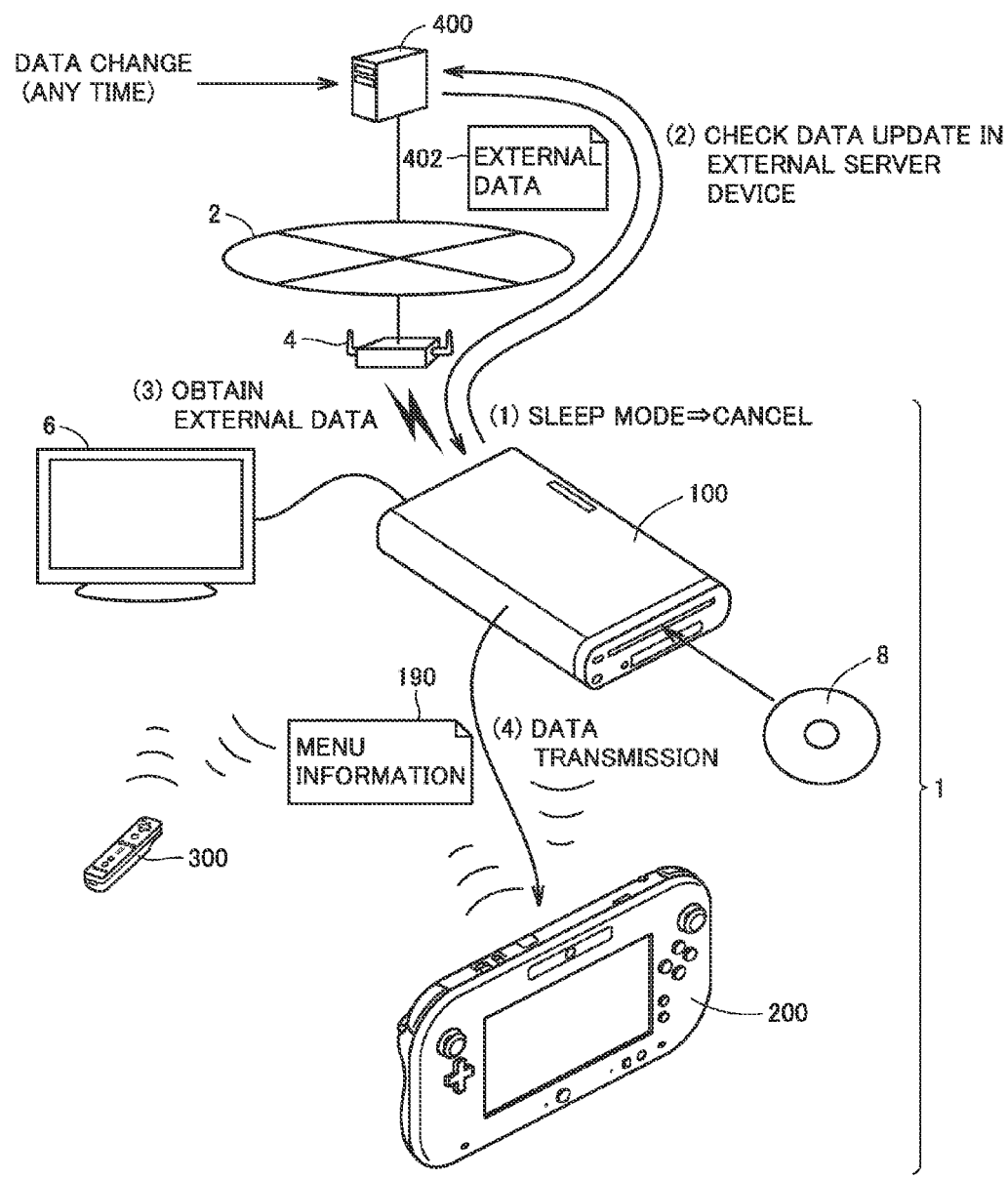
FIG. 4 shows an exemplary illustrative non-limiting schematic diagram illustrating processing outlines (No. 1) of the information processing system in the present embodiment.

Referring to FIG. 4, in external server device 400, data distributed to information processing system 1 is updated any time, and if some new data has been added, base unit device 100 obtains the new data by checking with external server device 400.

Main body device 100 can stand by in a sleep mode in addition to a normal operation mode. The "normal operation mode" herein means such a state that all functions of a device are executable, and the "sleep mode" means such a state that executable functions are restricted as compared with the "normal operation mode" and less power is consumed. For example, in the "sleep mode" of base unit device 100, system LSI 110 (see FIG. 2) representing the information processing portion of base unit device 100 is in a power saving state. By way of example of a specific implementing method, cut-off of power supply to system LSI 110 representing the information processing portion of base unit device 100 brings about the power saving state.

Terminal device 200 may also be able to stand by in the sleep mode, in addition to the normal operation mode. In a case that terminal device 200 is in the "normal operation mode," all functions of terminal device 200 are executable. In a case that terminal device 200 is in the "sleep mode", power consumption is less than in the "normal operation mode." For example, in the "sleep mode" of terminal device 200, codec LSI 210 representing the information processing portion of terminal device 200 is in the power saving state. By way of example of a specific implementing method, cut-off of power supply to codec LSI 210 representing the information processing portion of terminal device 200 brings about the power saving state.

In a case that a user is not operating information processing system 1, base unit device 100 is maintained in an OFF state or in the sleep mode. As shown in FIG. 4, in the present embodiment, even when base unit device 100 is in the sleep mode, base unit device 100 inquires of external server device 400 whether or not data has been updated, and if some new data has been added, it obtains that new data.

In a more specific processing procedure, base unit device 100 stands by in the sleep mode, and when a predetermined condition is satisfied, it cancels the sleep mode (processing (1) in FIG. 4). The predetermined condition includes such conditions that a predetermined time has come and/or a predetermined time interval has elapsed since the condition had previously been satisfied. As will be described later, an element managing a power supply obtains a time interval and/or an elapsed time from a time counter and controls power ON/OFF at timing when the predetermined condition is satisfied. Namely, base unit device 100 cancels the sleep mode based on information from the time counter.

In succession, base unit device 100 accesses external server device 400 and checks whether or not data has been updated in external server device 400 (processing (2) in FIG. 4). When data has been updated, base unit device 100 obtains data updated in external server device 400, that is, external data 402 from external network 2 (processing (3) in FIG. 4). Then, base unit device 100 transmits the obtained data to terminal device 200 (processing (4) in FIG. 4).

Main body device 100 may transmit external data 402 obtained from external server device 400 as it is to terminal device 200, however, it may edit the data to data adapted to terminal device 200 which is a destination. Namely, base unit device 100 transmits to terminal device 200, second data (menu information 190) obtained by editing first data received from external network 2.

Here, "edition" includes modification to data, combination with various types of information, optimization in accordance with a destination (in this example, terminal device 200), (partial) deletion, and addition.

After base unit device 100 has transmitted data from external network 2 to terminal device 200, it may return to the sleep mode. In this case, after sleep has been canceled, on the occasion of predetermined time and/or lapse of time, the base unit device can return to the sleep state. In this case as well, an element managing a power supply can control power ON/OFF based on a time interval and/or lapse of time obtained from the time counter.

The configuration as shown in FIG. 4 is used, for example, for such an application as distribution of some new information to information processing system 1. By adopting such a configuration, even while a user is not operating information processing system 1 (or base unit device 100), at least terminal device 200 can be notified of new information and an occasion that the user touches and/or launches information processing system 1 can be increased.

C. Processing Outlines (No. 2)

Figure 5:
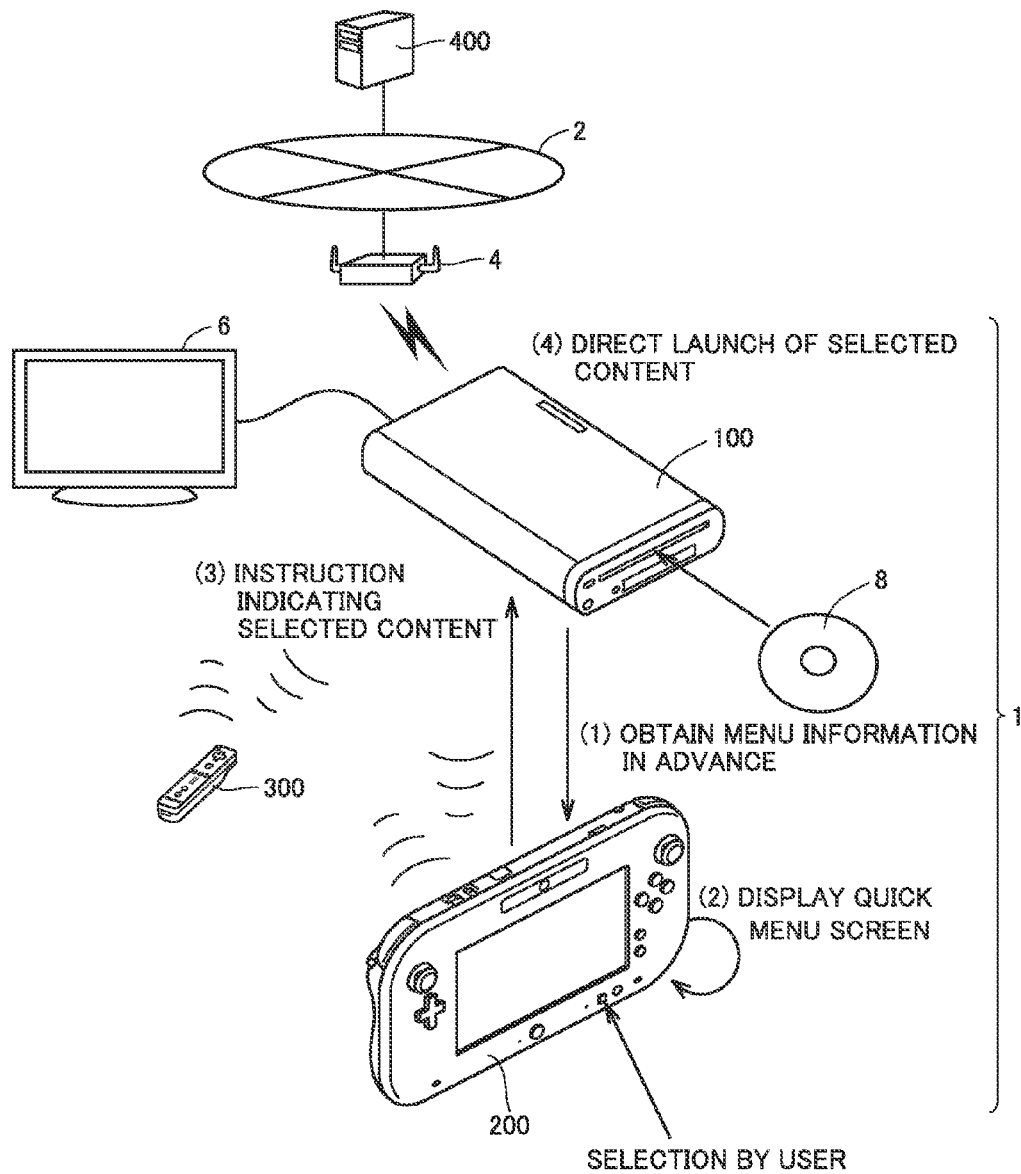
FIG. 5 shows an exemplary illustrative non-limiting schematic diagram illustrating processing outlines (No. 2) of the information processing system in the present embodiment.

Referring to FIG. 5, terminal device 200 is provided with a quick menu screen showing contents executable in base unit device 100, and when the user operates terminal device 200 to select any content displayed on the quick menu screen, the selected content is executed in base unit device 100. The contents may include various contents such as a game application program, a communication application program, and an application for displaying still pictures and/or moving video pictures. Herein, for the sake of convenience of explanation, contents may be explained as being read as applications.

In a more specific processing procedure, terminal device 200 obtains in advance menu information including information on selectable contents from base unit device 100 (processing (1) in FIG. 5). It is assumed that terminal device 200 is maintained in the OFF state or in the sleep mode and no content (typically, application) is executed either.

Menu information may be obtained before (or at the moment of) power OFF.

Terminal device 200 displays the quick menu screen (a first menu screen) based on the obtained menu information (processing (2) in FIG. 5). When a user selects a content on the displayed quick menu screen, terminal device 200 transmits, in response to selection by the user on the quick menu screen (processing (3) in FIG. 5), an instruction indicating the selected content to base unit device 100. Main body device 100 directly launches the selected content in response to the instruction when it receives the instruction from terminal device 200 before launch (processing (4) in FIG. 5). The state "before launch" includes not only such a state that base unit device 100 is completely off but also such a power saving state as the sleep mode.

By adopting the configuration as shown in FIG. 5, the user can know in advance contents executable in base unit device 100 by operating terminal device 200. In addition, simply by selecting a content, the selected content is executed in base unit device 100, and therefore a desired content can be enjoyed without any bothersome operation.

D. Processing Example in Connection with Display of Quick Menu Screen

Initially, a processing example in connection with display of the quick menu screen outlined with reference to FIG. 4 will be described. FIGS. 6 to 9 are diagrams for illustrating processing examples in connection with display of the quick menu screen in information processing system 1 in the present embodiment.

Figure 6:
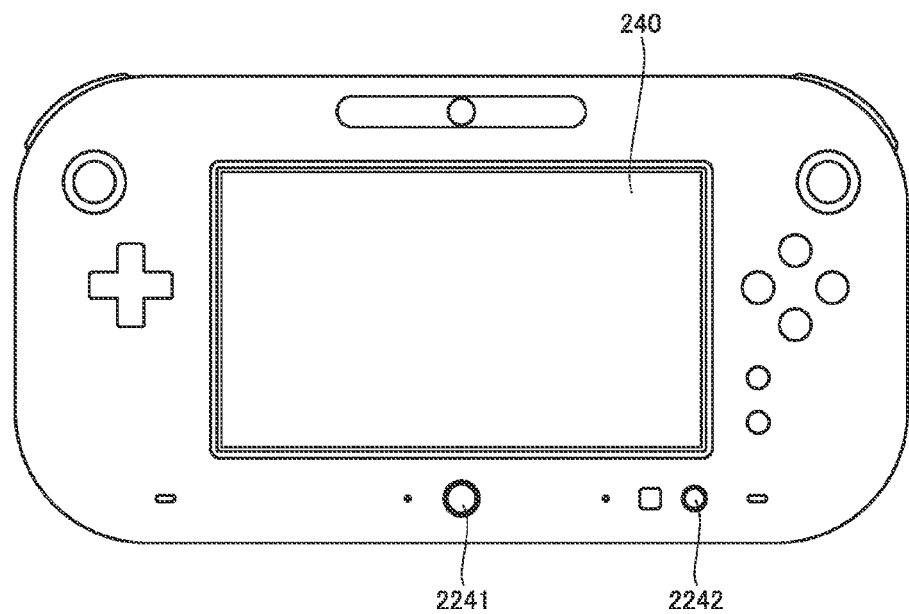
FIGS. 6 to 9 show exemplary illustrative non-limiting processing examples in connection with display of a quick menu screen in the information processing system in the present embodiment.

For the sake of convenience of explanation, it is assumed that processing (1) to (3) in FIG. 4 has been completed and base unit device 100 has obtained necessary data from external server device 400. In addition, it is assumed that terminal device 200 also stands by in the sleep mode. Namely, as shown in FIG. 6, no information is displayed on LCD 240 of terminal device 200. In the sleep mode of terminal device 200, only a backlight of LCD 240 may be turned off.

Figure 7:
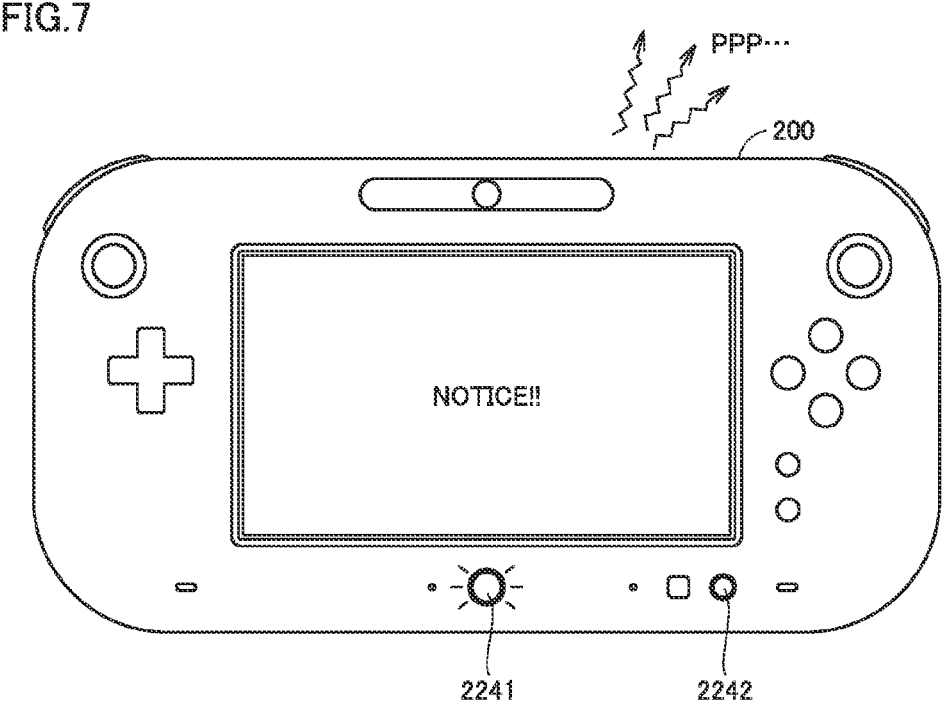

In such a state, base unit device 100 transmits obtained data to terminal device 200 (processing (4) in FIG. 4). Then, as shown in FIG. 7, a screen in accordance with data received from base unit device 100 is displayed on LCD 240 of terminal device 200. Namely, when terminal device 200 receives menu information 190 from base unit device 100, it displays a screen different from a quick menu screen 260 for notification thereof.

Concurrently with such display, processing for informing a user of reception of data from base unit device 100 is performed. For example, such an action that (1) a home button 2241 arranged on the main surface of terminal device 200 is turned on and/or caused to blink, (2) a sound for notification of reception is emitted from speaker 246 (see FIG. 3) of terminal device 200, and/or (c) vibrator 232 (see FIG. 3) of terminal device 200 generates vibration in terminal device 200 is performed. Namely, terminal device 200 includes a notification portion for informing, upon receiving data (menu information 190) from base unit device 100, a user of that fact.

Figure 8:
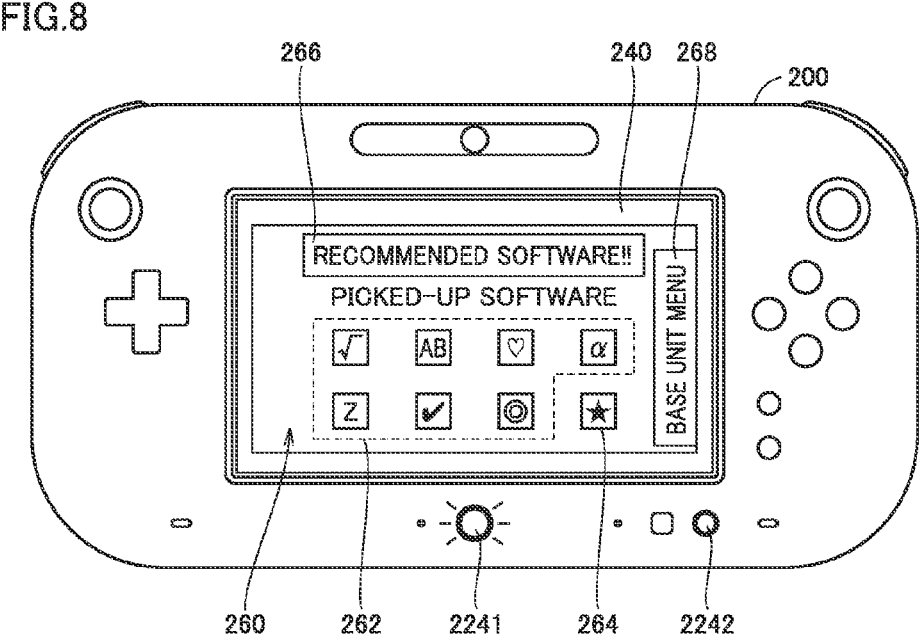

When the user presses home button 2241 and/or a power button 2242 while such a notification screen as shown in FIG. 7 is displayed, transition to a screen as shown in FIG. 8 is made.

Such processing that, if a user performs no operation while the notification screen as shown in FIG. 7 is displayed, this notification screen is erased may be performed. For example, when the user performs no operation for a predetermined period of time while the notification screen as shown in FIG. 7 is displayed, the backlight is gradually dimmed and finally it is turned off. Even after turn off of this backlight, home button 2241 may be maintained in a turned-on and/or blinking state in order to notify the user of reception of the notification screen. Alternatively, when the user presses home button 2241 and/or power button 2242 after turning off of the backlight, the screen shown in FIG. 7 may be displayed again or transition to the screen shown in FIG. 8 may be made.

FIG. 8 shows a state that quick menu screen 260 corresponding to a launcher screen directed to terminal device 200 is displayed. Quick menu screen 260 is generated basically in base unit device 100. Typically, quick menu screen 260 is generated based on information on applications executable in base unit device 100, data received from external server device 400, and history of applications executed in base unit device 100.

More specifically, quick menu screen 260 includes a group of icons 262 showing applications recently used by a user, an icon 264 generated based on data received from external server device 400, a notification message 266, and a button 268 for displaying quick menu screen 260 of base unit device 100.

Icons displayed in group of icons 262 are for launching an application relatively high in frequency of use by the user among applications which have been installed and executable in base unit device 100. Namely, some applications are extracted from the installed applications and icons corresponding thereto respectively are displayed, such that the user can more quickly select an application relatively high in the possibility of execution.

Icon 264 is an icon indicating execution of data received from external server device 400, such as a new application. Typically, such a form of use that a new trial application obtained from external server device 400 is installed in base unit device 100 and the user is notified of this installed, new application is assumed. Alternatively, a notice indicating that a new application is available may also be received in base unit device 100. Thus, when some change has occurred in base unit device 100, user's attention can be called to that fact through terminal device 200. In addition, the user can directly launch a newly arrived application and/or notice by selecting icon 264.

When any of the icon displayed in group of icons 262 and icon 264 is selected, explanation of an application corresponding to each icon may be displayed in a balloon form.

Button 268 is an icon for displaying a main menu screen provided by base unit device 100.

Notification message 266 gives a notification that data has been received from base unit device 100. In addition, notification message 266 may notify a user of a summary of received data. For example, explanation about a new application received from external server device 400 may be included in a message field of notification message 266. When the user selects notification message 266, transition to a screen as shown in FIG. 9 is made.

Figure 9:
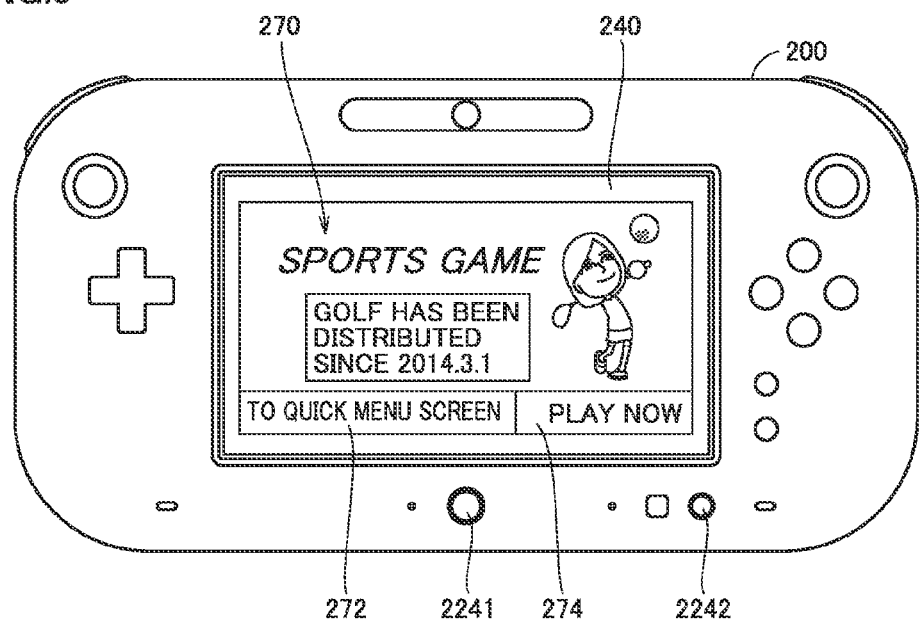

FIG. 9 shows such a state that notification message 266 has been selected and a notice screen 270 for the user is displayed. In notice screen 270 shown in FIG. 9, a user interface in which a newly released application is available and that application can immediately be made use of is provided. Specifically, notice screen 270 includes a "play now" button 274, and when the user selects button 274, transition to a screen for making use of the application displayed on notice screen 270 is made. Namely, processing the same as in the case that the user has selected icon 264 in quick menu screen 260 shown in FIG. 8 is performed.

In connection with such a new application, for example, a case that an application itself is transmitted from external server device 400 to base unit device 100 and installed in base unit device 100 and a case that base unit device 100 is notified of presence of an application are assumed. The former processing is typically used in distribution of a free application and/or a trial application, whereas the latter processing is typically used in obtaining an application at a downloading site.

When icon 264 in FIG. 8 and/or button 274 in FIG. 9 is selected and when the selected application has been installed in base unit device 100, that selected application is directly launched. When the selected application has not been installed in base unit device 100, redirection to a site for purchase and/or downloading of the selected application is made. The user can enjoy the selected application by going through due formalities at that site.

Thus, data on external network 2 can directly be accessed on quick menu screen 260 displayed on terminal device 200. Quick menu screen 260 may include a piece of advertisement information as shown in FIG. 9.

Terminal device 200 may display notice screen 270 as shown in FIG. 9 immediately after reception of a notification message, without interposing a screen as shown in FIG. 7 and/or FIG. 8.

When a "to quick menu screen" button 272 in FIG. 9 is selected, return to quick menu screen 260 shown in FIG. 8 is made.

In a case that accounts are created for a plurality of users in base unit device 100, an application may be executed after any icon in quick menu screen 260 shown in FIG. 8 and/or "play now" button 274 in notice screen 270 shown in FIG. 9 is selected and thereafter an account (a user) for executing an application is selected (and a password corresponding to the selected account is input as necessary).

In quick menu screen 260 shown in FIG. 8, a displayed message itself may be varied in accordance with whether or not an application has been installed. For example, in the former case, a button for launching an application may be displayed, and in the latter case, a button for jumping to a site for purchase and/or downloading of an application may be displayed.

Alternatively, whether or not to transmit data to terminal device 200 may be determined based on whether or not an application has been installed in base unit device 100.

E. Functional Configuration Involved with Display of Quick Menu Screen

Figure 10:
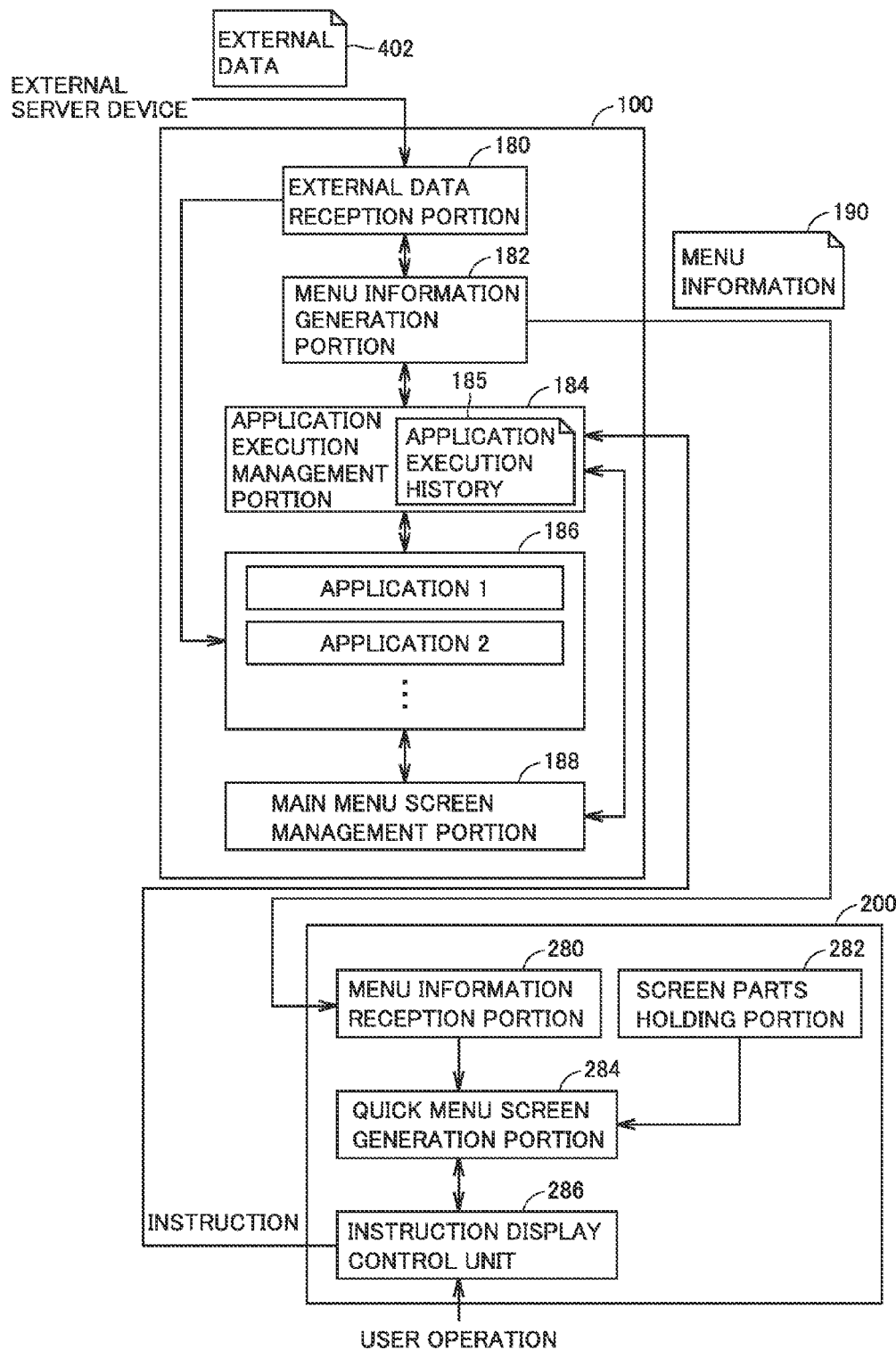
FIG. 10 shows an exemplary illustrative non-limiting block diagram illustrating a functional configuration for implementing processing in connection with display of the quick menu screen shown in FIG. 4.

Referring to FIG. 10, base unit device 100 includes, as its functional configuration, an external data reception portion 180, a menu information generation portion 182, an application execution management portion 184, an application storage portion 186, and a main menu screen management portion 188. Menu information generation portion 182, application execution management portion 184, and main menu screen management portion 188 are typically implemented as CPU 102 of system LSI 110 of base unit device 100 executes an operating system program.

External data reception portion 180 is implemented by making use of network communication module 120 (see FIG. 2). External data reception portion 180 inquires of external server device 400 whether or not data has been updated, and if some new data has been added, it obtains that external data 402.

Menu information generation portion 182 generates menu information 190 for having terminal device 200 display quick menu screen 260 based on external data 402 obtained by external data reception portion 180 and an application execution history 185 managed by application execution management portion 184, and transmits the menu information to terminal device 200. As described above, external data 402 received from external network 2 includes data on applications executable in base unit device 100.

Menu information generation portion 182 may typically incorporate into quick menu screen 260 preferentially, an application high in frequency of execution by the user based on application execution history 185, however, instead, it may incorporate a more recently installed application preferentially into quick menu screen 260.

Application execution management portion 184 executes a selected application as appropriate in response to an instruction from terminal device 200 and/or controller 300 (see FIG. 1). Application execution management portion 184 successively stores executed application execution history 185. Such information as frequency of an executed application may be stored in application execution history 185 for each user.

Application storage portion 186 holds an application installed in base unit device 100 and reads a selected application in response to an instruction from application execution management portion 184.

Main menu screen management portion 188 has display device 6 (see FIG. 1) or terminal device 200 display a main menu screen for execution of an application installed in base unit device 100.

As shown in FIG. 10, base unit device 100 generates menu information 190 (second data) based on information held in base unit device 100. Typically, base unit device 100 generates menu information 190 (second data) based on history of past processing information in base unit device 100.

Terminal device 200 includes, as its functional configuration, a menu information reception portion 280, a screen parts holding portion 282, a quick menu screen generation portion 284, and an instruction display control unit 286.

Menu information reception portion 280 receives menu information 190 from base unit device 100. Screen parts holding portion 282 holds screen parts necessary for displaying quick menu screen 260 on terminal device 200. Such screen parts include, for example, such a message as "NOTICE!!" as shown in FIG. 7 and/or button 268 as shown in FIG. 8.

Quick menu screen generation portion 284 generates and provides display of quick menu screen 260 with the use of menu information 190 received from base unit device 100 and screen parts stored in screen parts holding portion 282.

Instruction display control unit 286 switches a display screen and/or transmits an instruction to base unit device 100 in response to a user operation onto quick menu screen 260.

Quick menu screen generation portion 284 can also perform processing for displaying on LCD 240 an image (or a video image) received from base unit device 100 as it is, in addition to processing for generating and providing display of quick menu screen 260 with the use of menu information 190 received from base unit device 100 and screen parts stored in screen parts holding portion 282. Namely, terminal device 200 is configured to be able to select between a mode in which image information received from base unit device 100 is displayed as it is and a mode in which image information received from base unit device 100 is stored and a display image is constructed with the use of the stored image information. Namely, the function of quick menu screen generation portion 284 is summarized as follows:

(1) A function to display what is held in screen parts holding portion 282;

(2) A function to display "menu information 190" received by menu information reception portion 280 and once stored in terminal device 200; and (3) A function for display with (1) and (2) being combined.

With the functional configuration as above, processing outlines (No. 1) of information processing system 1 in the present embodiment are implemented.

F. Configuration for Stand-by in Sleep Mode

As described above, any of base unit device 100 and terminal device 200 can stand by in the sleep mode. A configuration for implementing such stand-by in the sleep mode will be described.

Figure 11A:
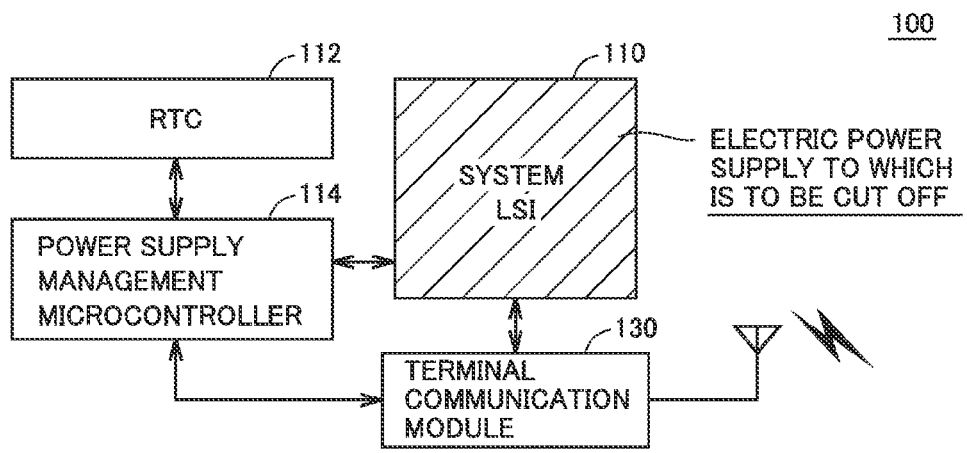
FIGS. 11A and 11B show exemplary illustrative non-limiting schematic diagrams each illustrating a configuration for implementing stand-by in a sleep mode in the information processing system in the present embodiment.
Figure 11B:
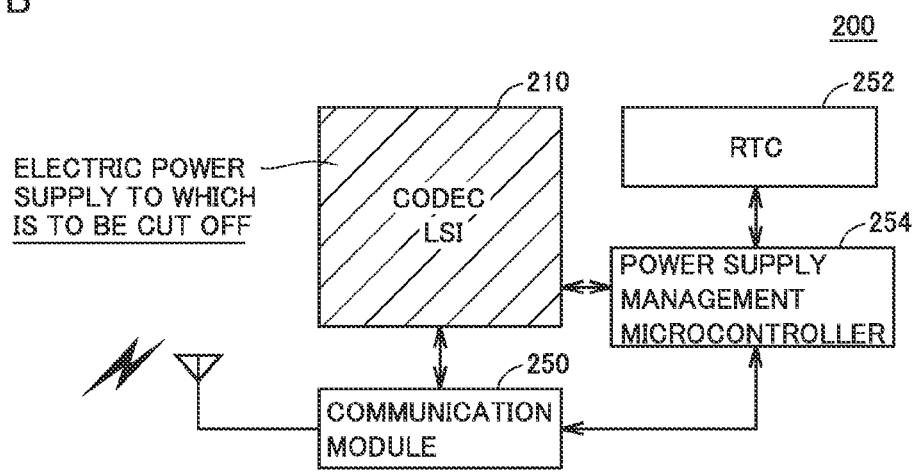

FIG. 11A shows a configuration example in base unit device 100, while FIG. 11B shows a configuration example in terminal device 200.

Referring to FIG. 11A, in base unit device 100, the sleep mode is set as electric power supply to system LSI 110 is cut off. Even in this sleep mode, terminal communication module 130, power supply management microcontroller 114, and RTC 112 are all maintained in an active state.

For example, when an instruction to launch any application is transmitted from terminal device 200 during the sleep mode of base unit device 100, terminal communication module 130 receives a launch instruction from terminal device 200 and brings system LSI 110 back to an active state. More specifically, the launch instruction transmitted from terminal device 200 includes a special command for canceling the sleep mode of base unit device 100. Terminal communication module 130 interprets the special command and transmits an internal command to power supply management microcontroller 114. Power supply management microcontroller 114 which has received the internal command activates system LSI 110 by providing the internal command thereto. Terminal communication module 130 has a data buffer, and it temporarily holds received data until activation of system LSI 110 is completed.

Thus, base unit device 100 includes a communication portion capable of processing data from terminal device 200 even in the sleep mode.

Referring to FIG. 11B, in terminal device 200, the sleep mode is implemented as electric power supply to codec LSI 210 is cut off as in base unit device 100. Even in this sleep mode, communication module 250, power supply management microcontroller 254, and RTC 252 are all maintained in the active state.

For example, when menu information 190 or the like is transmitted from base unit device 100 while terminal device 200 is in the sleep mode, communication module 250 receives menu information 190 from base unit device 100 and brings codec LSI 210 back to the active state. More specifically, a launch instruction transmitted from base unit device 100 includes a special command for canceling the sleep mode of terminal device 200. Communication module 250 interprets the special command and transmits an internal command to power supply management microcontroller 254. Power supply management microcontroller 254 which has received the internal command activates codec LSI 210 by providing the internal command thereto. Communication module 250 has a data buffer, and temporarily holds received data until activation of codec LSI 210 is completed.

Thus, terminal device 200 includes a communication portion capable of processing data from base unit device 100 even in the sleep mode.

In addition, base unit device 100 and terminal device 200 can make transition to the sleep mode, maintain the sleep mode, recover from the sleep mode, and make a transition again to the sleep mode when a predetermined condition is satisfied, without receiving information or a command from another device.

Such state management of the sleep mode is carried out by power supply management microcontroller 114 in base unit device 100 and by power supply management microcontroller 254 in terminal device 200.

By way of example, power supply management microcontroller 114 of base unit device 100 obtains time and/or a time interval (lapse of time since time at which certain processing setting has been made) from RTC 112 representing the time counter and activates/deactivates system LSI 110 based on the obtained time information. Typically, power supply management microcontroller 114 determines at any time whether or not obtained time information satisfies a predetermined condition. This predetermined condition includes such conditions that a predetermined time has come and/or a predetermined time interval has elapsed since the condition had previously been satisfied. Thus, base unit device 100 can intermittently and automatically cancel/make a transition to/maintain the sleep mode based on information from contained RTC 112.

Similarly, power supply management microcontroller 254 of terminal device 200 obtains time and/or a time interval (lapse of time since time at which certain processing setting has been made) from RTC 252 representing the time counter and activates/deactivates codec LSI 210 based on the obtained time information. Typically, power supply management microcontroller 254 determines at any time whether or not obtained time information satisfies a predetermined condition. This predetermined condition includes such conditions that a predetermined time has come and/or a predetermined time interval has elapsed since the condition had previously been satisfied. Thus, terminal device 200 can intermittently and automatically cancel/make a transition to/maintain the sleep mode based on information from contained RTC 252.

G. Processing Example in Connection with Operation on Quick Menu Screen

Figure 13:
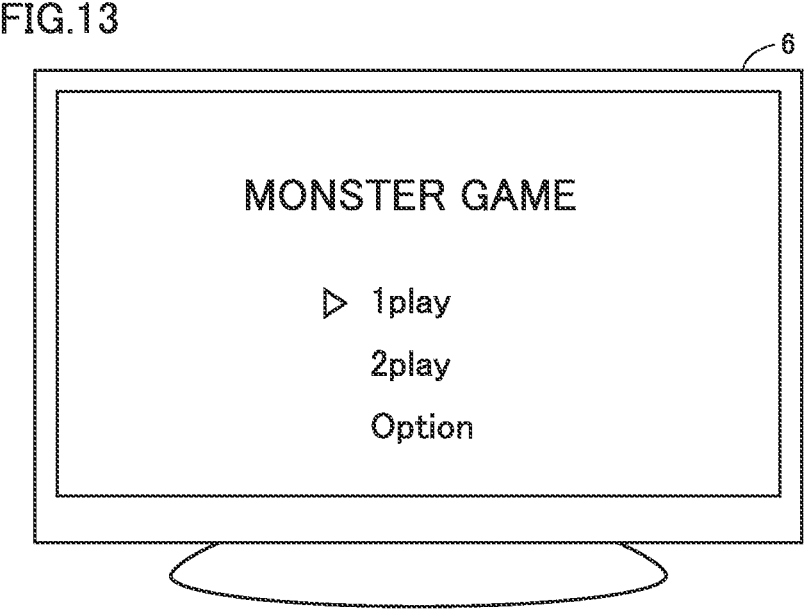

A processing example in connection with an operation onto the quick menu screen outlined with reference to FIG. 5 will now be described. FIGS. 12 to 14 are diagrams for illustrating processing examples in connection with an operation onto the quick menu screen in information processing system 1 in the present embodiment.

For the sake of convenience of explanation, it is assumed that processing (1) in FIG. 5 has been completed and terminal device 200 has obtained in advance menu information including information on selectable contents from base unit device 100. In addition, it is assumed that both of base unit device 100 and terminal device 200 stand by in the sleep mode. Namely, information is displayed on neither of display device 6 connected to base unit device 100 and LCD 240 of terminal device 200. In the sleep mode of terminal device 200, only a backlight of LCD 240 may be turned off.

As described above, contents of external data 402 obtained from external server device 400 may further be reflected on quick menu screen 260. For example, 266 as shown in FIG. 8 may be included. Namely, base unit device 100 may generate menu information 190 with the use of data from external network 2.

Terminal device 200 may obtain menu information 190 while base unit device 100 is in the OFF state or in the sleep mode.

When a user selects any icon displayed on quick menu screen 260 on terminal device 200 shown in FIG. 12, an instruction for launching the selected icon is transmitted to base unit device 100. Upon receiving this instruction, base unit device 100 cancels the sleep mode and directly launches the selected application. Here, "to directly launch" typically means that base unit device 100 returns from the sleep mode without displaying a main menu screen and executes the selected application. Any processing as allowing a user to have a desired application executed with a smaller number of operation procedures may be applicable, without limited to such processing.

Namely, when any icon displayed on quick menu screen 260 shown in FIG. 12 is selected, the selected application is executed in base unit device 100 and a screen of that executed application is displayed on display device 6 as shown in FIG. 13. Thus, with information processing system 1 in the present embodiment, the user can directly launch a content in a single operation on quick menu screen 260 (the first menu screen). By adopting such a processing form, the user can touch terminal device 200 to launch an intended application in a shorter period of time and enjoy the application.

When the user selects button 268 in quick menu screen 260 shown in FIG. 12, the main menu screen is displayed. More specifically, in response to an instruction from terminal device 200, base unit device 100 returns from the sleep mode and displays a main menu screen 290 as shown in FIG. 14 on display device 6. When base unit device 100 cancels the sleep mode and returns to the normal operation mode, LCD 240 of terminal device 200 may display a video image substantially the same as a video image output from base unit device 100 to display device 6.

FIG. 14 shows an example in which main menu screen 290 is displayed on both of display device 6 and LCD 240 of terminal device 200. By operating main menu screen 290, the user can also have a desired application executed. Namely, terminal device 200 can display main menu screen 290 (a second menu screen different from the first menu screen) provided after base unit device 100 is launched. As the user selects button 268 included in quick menu screen 260 in FIG. 12, main menu screen 290 (the second menu screen) can directly be displayed over quick menu screen 260 (the first menu screen).

As described above, information processing system 1 in the present embodiment includes base unit device 100 (the first information processing terminal) and terminal device 200 (the second information processing terminal) which can communicate, and when the user operates terminal device 200 to select a content while base unit device 100 is in a non-launched state, base unit device 100 can directly launch the content selected by the user.

Alternatively, a configuration as below can also be adopted. For example, concurrently with display of quick menu screen 260 on terminal device 200, base unit device 100 also starts launch from the OFF state or the sleep state. For example, in a case that a time period for launch of base unit device 100 is longer than that of terminal device 200, quick menu screen 260 is displayed on terminal device 200 which is launched earlier, until launch of base unit device 100 is completed, so that a time period during which the user can do nothing can be reduced. After the quick menu screen is displayed on terminal device 200, base unit device 100 is normally launched for displaying a main menu screen. When an operation onto quick menu screen 260 (typically, an operation for selecting any icon included in group of icons 262) is performed on terminal device 200 by the time when normal launch is completed, however, base unit device 100 aborts the normal launch processing which is being performed and directly launches an application involved with the selected icon.

H. Processing Procedure

A typical processing procedure in information processing system 1 in the present embodiment will now be summarized below.

Referring to FIG. 15, initially, both of base unit device 100 and terminal device 200 stand by in the sleep mode (sequence SQ2). Thereafter, when a predetermined condition is satisfied (sequence SQ4), base unit device 100 cancels the sleep mode (sequence SQ6).

Main body device 100 inquires of external server device 400 whether or not data has been updated (sequence SQ8), and if some new data has been added, it obtains external data 402 from external server device 400 (that is, external network 2) (sequence SQ10). Processing in sequences SQ8 and SQ10 does not have to necessarily be performed, and it may be performed only when a predetermined condition is satisfied.

In succession, base unit device 100 generates menu information 190 (sequence SQ12) and transmits generated menu information 190 to terminal device 200 (sequence SQ14). Main body device 100 generates menu information 190 based on information held in base unit device 100 and/or external data 402 obtained from external server device 400. Thereafter, base unit device 100 makes a transition again to the sleep mode and stands by in the sleep mode (sequence SQ16).

On the other hand, when terminal device 200 receives menu information 190 transmitted from base unit device 100, it cancels the sleep mode (sequence SQ20) and generates quick menu screen 260 (sequence SQ22). Terminal device 200 makes a transition again to the sleep mode and stands by in the sleep mode (sequence SQ24). Before making a transition to the sleep mode, a notification screen as shown in FIG. 7 may be displayed and/or an operation for informing the user of that fact may be performed.

When the user performs some operation onto terminal device 200 (for example, an operation for launching a quick menu) (sequence SQ26), terminal device 200 cancels the sleep mode (sequence SQ28) and displays quick menu screen 260 which has previously been created (sequence SQ30). When the user performs some operation on quick menu screen 260 (for example, an operation for selecting any icon included in group of icons 262) (sequence SQ32), an instruction in response to that operation is generated and transmitted to base unit device 100 (sequence SQ34). Typically, an instruction for launching a content (an application) selected by the user on quick screen 260 is transmitted to base unit device 100.

Upon receiving the instruction from terminal device 200, base unit device 100 cancels the sleep mode (sequence SQ36) and directly launches the selected content (application) (sequence SQ38).

Thereafter, base unit device 100 and terminal device 200 both operate in the normal operation mode.

The sequence diagram shown in FIG. 16 is different from the sequence diagram shown in FIG. 15 in sequences SQ26 to SQ 32. More specifically, when the user performs some operation onto terminal device 200 (for example, an operation for launching a quick menu) (sequence SQ26), terminal device 200 cancels the sleep mode (sequence SQ28) and displays quick menu screen 260 which has previously been created (sequence SQ30). In parallel, terminal device 200 transmits a command for canceling the sleep mode to base unit device 100 (sequence SQ32). Then, the sleep mode of base unit device 100 is canceled.

The user selects an application or an account on terminal device 200 (sequence SQ34). During this period, base unit device 100 proceeds with launch processing until an application start screen (sequence SQ36). In response to a command operation by a user (for example, an operation of a start button) (sequence SQ38), base unit device 100 starts an application (sequence SQ40).

A processing manner may be as below. Namely, when the user performs some operation onto quick menu screen 260, an instruction in accordance with that operation is generated and transmitted to base unit device 100. Typically, an instruction for launching a content (an application) selected by the user on quick menu screen 260 is transmitted to base unit device 100.

After sequence SQ28, when data received from the base unit device by terminal device 200 is notification message 266, notification message 266 may immediately be displayed.

Alternatively, after an instruction from terminal device 200 is received, base unit device 100 may cancel the sleep mode and directly launch the selected content (application).

Thereafter, base unit device 100 and terminal device 200 both operate in the normal operation mode.

After sequence SQ32 in FIG. 16, base unit device 100 performs processing involved with normal launch. In this case, unless an application or an account is selected on terminal device 200, normal launch by base unit device 100 is continued and a main menu is displayed after completion of normal launch. On the other hand, only when an application or an account is selected on terminal device 200, the selected application may directly be launched.

I. Other Forms

Devices and software constituting information processing system 1 are not limited to those described in the present embodiment. For example, at least some of those described as the functions of base unit device 100 in the present embodiment may be provided in an external server device. Namely, instead of single base unit device 100, a system constituted of a server and a terminal may be employed. In this case, each means in the system is implemented by processing by one or more processors in base unit device 100, processing by one or more processors in the server, or processing in cooperation between the processor(s) in base unit device 100 and the processor(s) in the server. Processing to be allocated can be designed as appropriate based on the common technical knowledge of a person skilled in the art.

A program executed in base unit device 100 is not limited to those provided by a non-transitory storage medium. Various programs may be provided by downloading through such a network as the Internet. Alternatively, system software of base unit device 100 may be provided by a non-transitory storage medium or through downloading.

J. Advantages

According to the present embodiment, even when a user is not operating information processing system 1 (or base unit device 100), at least terminal device 200 can be notified of new information so that the occasion for the user to touch and/or launch information processing system 1 can be increased.

According to the present embodiment, the user can know in advance contents executable in base unit device 100 by operating terminal device 200, and simply by selecting a content, the selected content is performed in base unit device 100. Therefore, the user can enjoy the desired content without performing a bothersome operation.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims. The word "comprising" does not exclude the presence of elements or steps other than those listed in a claim. The word "a" or "an" preceding an element does not exclude the presence of a plurality of such elements.

What is claimed is:

1. An information processing system, comprising:
   a first information processing terminal configured to connect to an external network; and
   a second information processing terminal configured to receive data from the external network through the first information processing terminal,
   the first information processing terminal being configured to stand by in a sleep mode, and to cancel the sleep mode when a predetermined condition is satisfied and transmit the data from the external network to the second information processing terminal, wherein
   the first information processing terminal is configured to return to the sleep mode after the first information processing terminal transmits the data from the external network to the second information processing terminal, wherein:
   the first information processing terminal is configured to cancel the sleep mode based on information from a time counter, and
   the second information processing terminal is configured to inform a user of reception of data from the first information processing terminal when the second information processing terminal receives the data from the first information processing terminal.

2. The information processing system according to claim 1, wherein
   the first information processing terminal is configured to stand by in the sleep mode, and to cancel the sleep mode when the predetermined condition is satisfied and obtain the data from the external network.

3. The information processing system according to claim 1, wherein
   the first information processing terminal is configured to transmit to the second information processing terminal, second data obtained by editing first data received from the external network.

4. The information processing system according to claim 3, wherein
   the first information processing terminal is configured to generate the second data based on information held in the first information processing terminal.

5. The information processing system according to claim 3, wherein
   the first information processing terminal is configured to generate the second data based on history of past processing information in the first information processing terminal.

6. The information processing system according to claim 1, wherein
   in the sleep mode, an information processing portion of the first information processing terminal is in a power saving state.

7. The information processing system according to claim 1, wherein
   in the sleep mode, electric power supply to an information processing portion of the first information processing terminal is cut off.

8. The information processing system according to claim 1, wherein
   the second information processing terminal also stands by in the sleep mode.

9. The information processing system according to claim 8, wherein
   in the sleep mode, an information processing portion of the second information processing terminal is in a power saving state.

10. The information processing system according to claim 8, wherein
    in the sleep mode, electric power supply to an information processing portion of the second information processing terminal is cut off.

11. The information processing system according to claim 8, wherein
    the first information processing terminal includes a communication portion configured to process data from the second information processing terminal even in the sleep mode, and
    the second information processing terminal includes a communication portion configured to process data from the first information processing terminal even in the sleep mode.

12. The information processing system according to claim 1, wherein
    the data received from the external network includes data on an application executable in the first information processing terminal.

13. The information processing system according to claim 1, wherein
    the first information processing terminal has no image display portion.

14. The information processing system according to claim 1, wherein
    the second information processing terminal is configured to obtain the data from the external network only through the first information processing terminal.

15. A non-transitory storage medium encoded with a computer readable information processing program executed by one or more processors of an information processing terminal which is configured to connect to an external network, the information processing program causing the one or more processors to:
    have another information processing terminal receive data from the external network through the information processing terminal; and
    stand by in a sleep mode, and cancel the sleep mode when a predetermined condition is satisfied and transmit the data from the external network to the another information processing terminal, wherein return to the sleep mode after the information processing terminal transmits the data from the external network to the another information processing terminal; and cancel the sleep mode based on information from a time counter; wherein the another information processing terminal is configured to inform a user of reception of data from the information processing terminal when the another information processing terminal receives the data from the information processing terminal.

16. An information processing terminal configured to:

connect to an external network;

have another information processing terminal receive data from the external network through the information processing terminal; and stand by in a sleep mode, and cancel the sleep mode when a predetermined condition is satisfied and transmit the data from the external network to the another information processing terminal, return to the sleep mode after the information processing terminal transmits the data from the external network to the another information processing terminal, cancel the sleep mode based on information from a time counter; wherein the another information processing terminal is configured to inform a user of reception of data from the information processing terminal when the another information processing terminal receives the data from the information processing terminal.

* * * * *